May 13, 1952     J. B. McKAY ET AL     2,596,580
TREATING ARSENICAL GOLD ORES

Filed Jan. 5, 1950     3 Sheets-Sheet 2

INVENTORS:
JAMES B. McKAY &
JAMES V. THOMPSON,
BY
Arthur Middleton
ATTORNEY

INVENTORS:
JAMES B. MCKAY &
JAMES V. THOMPSON,
BY
Arthur Middleton
ATTORNEY

Patented May 13, 1952

2,596,580

UNITED STATES PATENT OFFICE 2,596,580

TREATING ARSENICAL GOLD ORES

James B. McKay, Balmertown, Ontario, Canada, and James V. Thompson, Denver, Colo., assignors to The Dorr Company, Stamford, Conn., a corporation of Delaware Application January 5, 1950, Serial No. 136,962

2 Claims. (Cl. 75—9)

This invention relates to the roasting of sulfide-mineral ores and particularly to the roasting of those gold-bearing ores which contain commercially significant amounts of gold in association with the mineral arsenopyrite, and is a continuation-in-part of our copending application Serial No. 678,276, filed June 21, 1946, now abandoned.

The ore used for experimentation leading to the invention disclosed herein was a gold-bearing ore consisting essentially of arsenopyrite, pyrite, and stibnite, with lesser amounts of other sulfide minerals, together with such gangue or rock minerals as carbonates of lime, magnesia, etc., with quartz. In this ore, as in many arsenopyritic gold-bearing ores, there is present in addition to so-called free gold, which may be readily recovered by the usual methods of chemical or mechanical concentration, also a commercially significant amount of gold which is not recoverable by ordinary means of concentration. Recovery of such gold from the arsenopyrite has been attempted by means of roasting the ore and then cyaniding the roasted ore. But heretofore, by use of roasting and cyanidation, only a portion of the gold associated with arsenopyrite has been recoverable, and significant economic loss resulted from high gold values in cyanidation tailings. We disclose an invention for roasting whereby the gold losses in cyanidation tailings in treating such ore are reduced to a low value.

Roasting of sulfide ores is a process of oxidation. To make a roasted product amenable to high gold recovery by cyanide leaching, chemical elements present in combination with each other in the mineral or minerals undergoing roasting must be converted to an oxide form of said elements. The conversion of elements such as iron and arsenic present in combined form in the mineral being roasted is necessary to secure a cyanidable roasted product; a product containing no residual undecomposed mineral still present in its original, natural, unfractured state of chemical combination. It is possible by use of this invention to produce a roasted ore containing substantially no unroasted residue of oxidizable minerals and attain high recovery of gold values in the roasted ore subsequent cyanidation process.

But it has commonly been found in practice that when a mineral such as arsenopyrite, containing gold, is roasted in conventional equipment by conventional methods, oxidation of elements originally present in the mineral arsenopyrite and associated oxidizable minerals may be carried substantially to completion; yet gold recovery from the roasted ore by cyanidation is not substantially complete and gold losses in cyanidation tailings are high.

When roasting an arsenopyrite, the following reactions, inter alia, are theoretically possible:

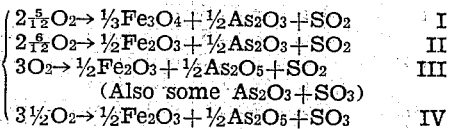

$$FeAsS + \begin{cases} 2\tfrac{5}{12}O_2 \rightarrow \tfrac{1}{3}Fe_3O_4 + \tfrac{1}{2}As_2O_3 + SO_2 & \text{I} \\ 2\tfrac{6}{12}O_2 \rightarrow \tfrac{1}{2}Fe_2O_3 + \tfrac{1}{2}As_2O_3 + SO_2 & \text{II} \\ 3O_2 \rightarrow \tfrac{1}{2}Fe_2O_3 + \tfrac{1}{2}As_2O_5 + SO_2 & \text{III} \\ \quad \text{(Also some } As_2O_3 + SO_3) \\ 3\tfrac{1}{2}O_2 \rightarrow \tfrac{1}{2}Fe_2O_3 + \tfrac{1}{2}As_2O_5 + SO_3 & \text{IV} \end{cases}$$

We have discovered that during the roasting of an arsenopyritic gold-bearing ore, if oxygen is furnished to the ore during roasting in considerable excess over the amount shown by calculation based upon the chemical composition of the ore to be required for the selective oxidation of its oxidizable constituents which is disclosed later, then the leaching quality of the roasted ore is low. Such ore, roasted with an excess of oxygen, does not yield its gold adequately when subsequently cyanided.

Specifically we have discovered that there is a correlation between the oxidation state of the minerals in the roasted ore and gold recovery and cyanide consumption. The problem then is to discover what oxidation state gives optimum gold recovery with minimum cyanide consumption and to discover a process to obtain the desired conditions. As far as applicants know, the problem of controlling the manner of roasting so as to get high gold recovery has never been known before.

We have found that oxygen must not be supplied during said roasting in such quantity as to be present in the stack gas leaving the roaster to the extent of more than $\tfrac{1}{10}$ to $\tfrac{5}{10}$ of one percent by volume. Our roasting operation may be performed satisfactorily by so proportioning the air input and raw ore input as to produce a completely roasted ore under conditions leaving no oxygen present in the stack gas, but we regulate air and raw feed input in such a manner as to leave from $\tfrac{1}{10}$ to $\tfrac{5}{10}$ of one percent of oxygen present in the stack gas. By operating the roaster in this manner, the adverse effects of a large excess of air may be avoided; and the presence of a trace of oxygen in the exit gas gives continuous evidence that enough air is supplied in proportion to raw feed to permit complete roasting of the feed; that is, for the lowest stable oxidation of the iron, sulfur and arsenic content of the ore.

It is, then, an object of this invention to produce a substantially completely roasted gold-bearing arsenopyritic ore in such a manner as to make possible the subsequent substantially complete recovery of gold from the roasted ore by cyanidation.

Before presenting a detailed description of apparatus and process constituting the invention hereof, it is worth-while to note that according to this invention, the roasting of ore is accomplished in a furnace or reactor wherein a mass of roasted ore, or ore undergoing roasting, is confined within a gas-tight vessel in a state of semi-suspension commonly known as fluidized solids, said state being maintained by the admission and upward passage of a controlled flow of air through the mass of ore. Raw arsenopyritic gold-bearing ore is continuously supplied to the roaster, and roasted ore is continuously removed. The air or gas velocity is commonly within the range of 0.5 to 2.5 feet per second essentially vertically upward through the roasting charge. Hence, the period of residence of gas within the reactor is relatively brief, and changes in conditions within the reactor insofar as oxygen utilization is concerned are quickly indicated by changes in the composition of the gas leaving the roaster.

According to this invention, the roasting of sulfide ore and particularly the roasting of arsenopyritic gold-bearing ores is carried out in an apparatus which permits accurate regulation of conditions affecting the quality of the roasted ores. And, further, the conditions obtaining within the roasting apparatus at any time may be readily determined and adjusted as required, or the operation of the roasting apparatus may be automatically regulated within desired limits, as we shall subsequently disclose.

As a control for maintaining the proper oxygen control it has been found that the roasted ore when leaving the reactor must be maintained as a black color (indicating $Fe_3O_4$) rather than a red color (indicating $Fe_2O_3$). By so maintaining the black color, the formation of $As_2O_5$ is prevented and $As_2O_3$ and/or $As_2S_x$ forms and volatilizes. By removing the arsenic in this fashion, the pores of the ore are opened and the cyanide solution can reach the previously entrapped gold values. If the roast begins to assume a red color, then either the feed may be increased slightly or the air decreased slightly, with feed increase being preferable, until the black color returns.

In terms of the equations listed above we have found that the influent oxygen should be controlled so that the reactions will fall between those cited in Equations I and II. This means that a very close control over influent oxygen is necessary to effect this invention; enough oxygen is furnished to convert the iron compounds to $Fe_3O_4$ but not enough to form $Fe_2O_3$. By maintaining at least a trace of $Fe_3O_4$ present, no $As_2O_5$ can form and thus the $Fe_3O_4$ presence becomes the yardstick.

From the point of view of oxygen requirements, its supply must be controlled so as to furnish 100% to 120% of the theoretical oxygen needed. We have found these conditions to be very critical. If not enough oxygen is supplied to bring it up to Equation I, then cyanide consumption will be high. If too much oxygen is supplied, so that the amount required for Equation II is exceeded, then gold recovery will be low. In order to maintain it between these two equations requires a very fine control. The two equations as written require a difference in molar oxygen supply of between $2\frac{5}{12}$ and $2\frac{6}{12}$ moles, or, between 100% and 104% of theoretical oxygen. This sort of control is unknown and virtually impossible by any other known process. We have found in practice that the amount of oxygen supplied will vary with the type of ore because of reactions due to impurities, principally alkaline earth metals going to sulfates and arsenates. But the amount of oxygen required to oxidize these impurities is a fixed amount for any given ore and thus the control must still be between the same close limits, i. e., $2\frac{5}{12}+X$ to $2\frac{6}{12}+X$, wherein X represents the oxygen consumed by impurities. In practice this will go to as high as about 120% of theoretical oxygen, the excess over 104% representing the amount necessary to oxidize the impurities.

We have also found that a convenient method of controlling this close oxygen requirement is by observing the color of the plume arising from the stack of the reactor. If a yellow or red plume is seen, it denotes a deficiency of oxygen and will produce an underroasted product, namely one in which the mineral arsenopyrite is not completely broken up by oxidation and which consequently does not respond to cyanide leaching to give high gold recovery. On the other hand, when the stack gas is clear and colorless, it denotes overoxidation conditions in the calcine and consequently a poor gold recovery. If the oxygen supply is adjusted to meet applicant's claim, or to have it lie within 100% to 120% of the selective theoretical requirements, the colored plume will just disappear and no more.

The novel features of this invention will be understood and more fully appreciated from the following description, particularly when considered in connection with the accompanying drawings which constitute a part of this specification.

Figure 1:
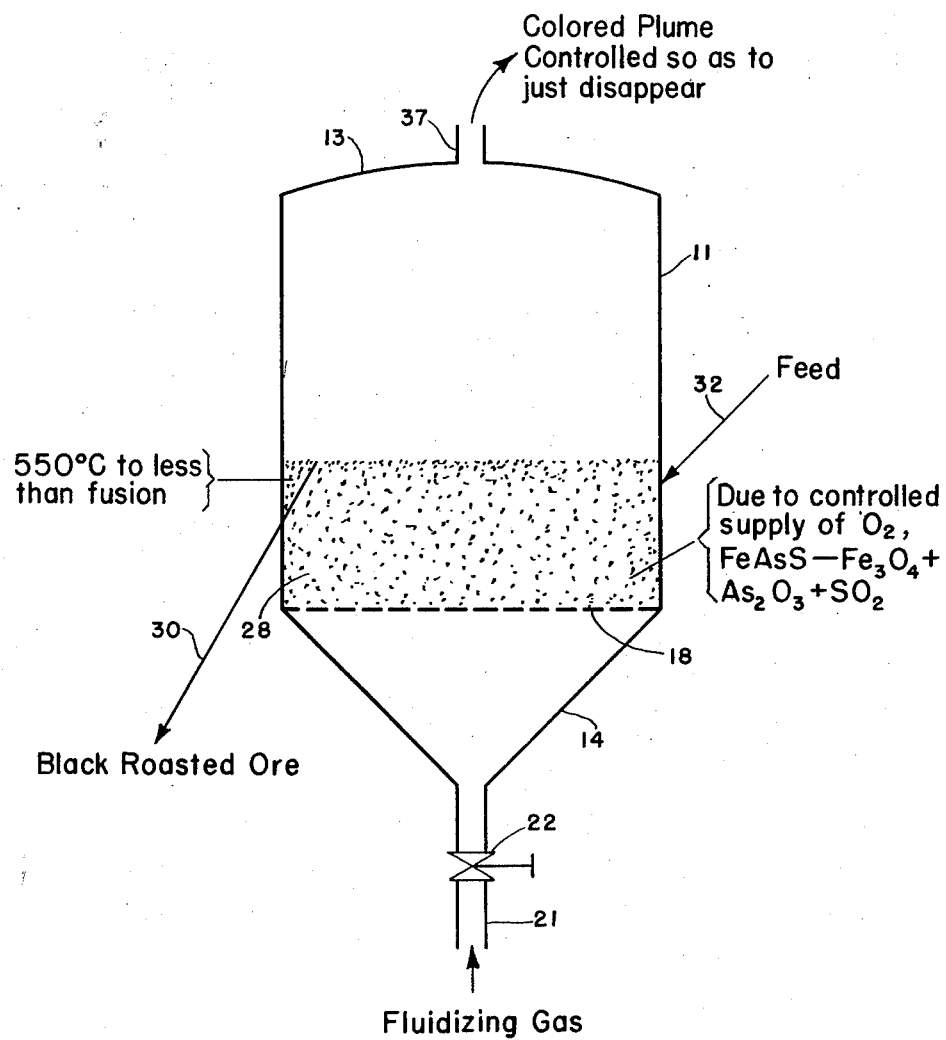
Figure 1 is an idealized view of a roasting apparatus showing schematically the reactions which occur and the products which are recovered.

Reference is now made to the drawings in detail:

In Figure 1 there is shown a reactor collectively designated 11 which may be used for carrying out the process outlined in this invention. Reactor 11 has a top member 13, a bottom member 14 and a constriction plate 18. Gas for fluidizing the charge of particles to be treated may be introduced through conduit means 21 controlled by valve 22. The charge of particles to be treated enters reactor 11 through feed mechanism 32 which is beneath the surface level of the fluidized bed 28. Conduit means 30 are used to withdraw the treated particles from the reactor. As the legends on the drawing show the treated particles are discharged as a black roasted ore.

The temperature in the reactor is maintained in the range of from 550° C. to less than fusion. Due to the temperature reached in the reactor and due to the reactions which are caused to occur therein, certain gases are given off which are discharged through conduit means 37. As the legend indicates there will be seen a colored plume which is controlled so as to just disappear. The means for so controlling the disappearance of this plume are described elsewhere in this specification.

Figure 2:
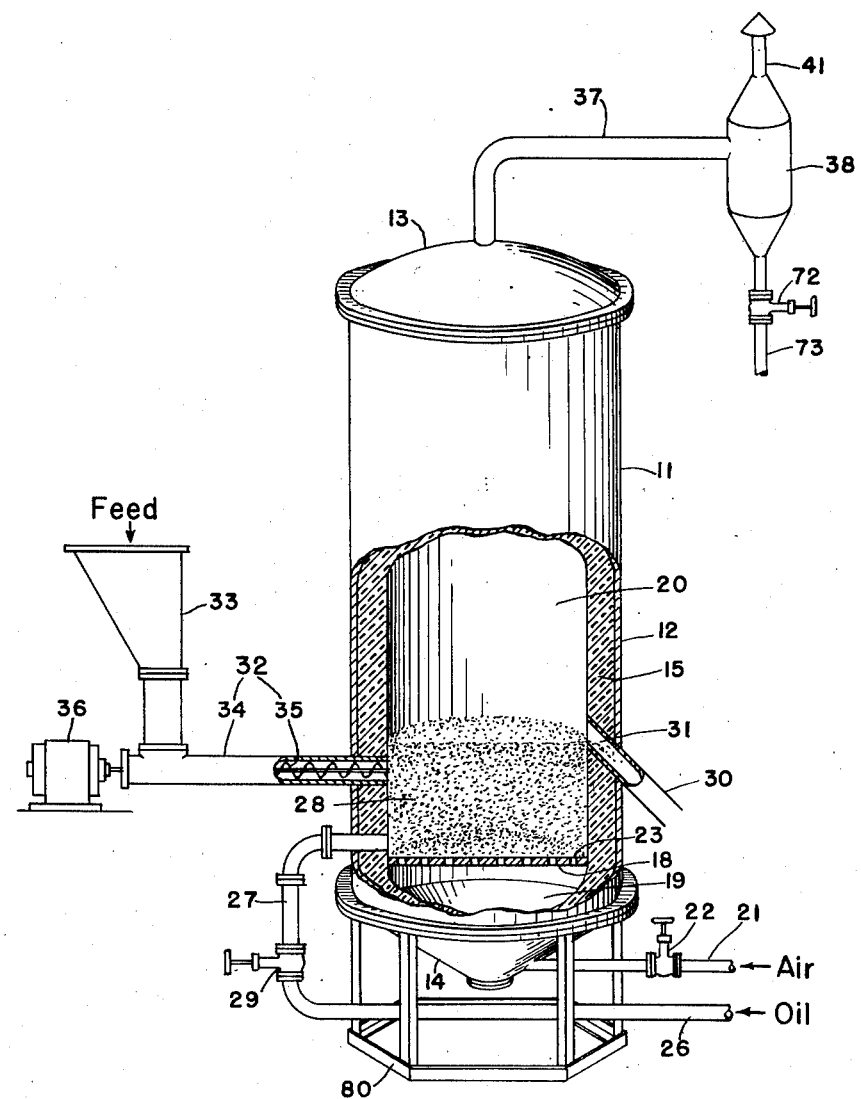
Figure 2 is a vertical view partially in section of a roasting apparatus or reactor of a type suitable for performing the invention and wherein and by which the invention may be commercially realized. The showing of this figure may be considered as a vertical sectional view looking slantingly downwardly thereat.

Referring now to Figure 2, the reactor furnace collectively designated 11 embodies a metallic gas-tight casting structure having a marginal shell or circular side wall member 12, a top member 13 detachably secured to the shell member 12 and a bottom member 14 also detachably secured to the shell member 12 whereby a relatively gas-tight shell or casing structure is completed. Each of the members just referred to is provided with a suitable lining of fire-resisting material such as refractory brick 15. An apertured constriction plate 18 divides the interior of the reaction chamber structure or furnace into a lower air-receiving compartment or wind-box 19 below the constriction plate and a reaction chamber or compartment 20 above the plate. The entire reactor is supported on the framework 80.

An air, or other oxygen supply medium is controllably delivered through an air-supply pipe 21 provided with a positionable stop or air-control valve 22.

The constriction plate has several openings 23 therethrough which permit an upward flow past and a dispersed delivery of air, or other gaseous medium, which is forcibly passed into, upwardly through, and from its associated orifice or apertured opening.

There also leads into a lower region of the reactor compartment 20, to wit, into a locality shortly above the constriction plate 18, a pipe 26 having a delivery section 27 by which starting-up fuel is deliverable into a bed or charge 28 of finely divided ore about to be treated. Fuel may be supplied for a lighting up or igniting operation or even until the bed or charge is heated to condition proper for normal operation. The fuel supply pipe 26 has a stop valve 29 and the fuel supplied through this pipe 26 may be either gas or oil.

Air for supporting combustion and also for continuing the heating after the starting up fuel has been shut off is supplied under pressure to the lower air-receiving compartment 19 from which it upflows through the aperture 23 of the constriction plate 18 and from whence it is distributingly delivered into the bed or charge 28.

The ore to be roasted contains oxidizable elements, as has been pointed out heretofore, which will burn in the presence of air to give off heat and when the starting up operation has been effected by the use of gas or oil, the requisite heat for continuing the process is derived from the exothermic reactions that take place. The range of temperature wherein the desired result and ends are attained is substantially above 550° C., and a roasted ore amenable to cyanidation may be produced at a temperature of 800° C. or even higher.

Reverting again to the description of the reactor construction, it will be noted that a roasted-product discharge pipe 30 leads downwardly and outwardly from the reaction chamber 20 and that the intake portion 31 of said pipe serves as a means for determining the operative surface level of the bed 28 of solids undergoing treatment within the reactor. The elevation of the intake end 31 of this discharge pipe is higher than that of the discharge and section 27 of the fuel supply pipe 26.

A feed discharge means generally designated 32 having a feed hopper 33, a delivery feed conduit 34 and a feed screw 35 is provided as means for delivering ore to be treated to the bed 28 for treatment therein, as for example, at an elevation shown near the top or operative surface level 00 of said bed as determined by said intake 31 of the discharge pipe 30 and at a locality functionally remote from said intake 31. A motor and speed reducing and power transmission collectively designated 36 serves to operate the feed screw 35.

Gas off-take means leads from the upper interior portion of the reactor 11, for example, there may be a gas take-off pipe 37 to a cyclone separator or dust-separating means 38. Solids which are separated may be discharged through conduit 73 controlled by valve 72. The stack gases or "plume" may be discharged through chimney 41.

During a starting-up period and also during the normal operation of the reactor, air supplied through the pipe 21 into the lower compartment is forcibly passed upwardly through the apertures of the constriction plate and is distributingly delivered into the bottom portion of the charge 28 in a manner whereby the solids of the charge are maintained in a state of mobile suspension resembling a boiling mass and at a non-segregating velocity, to wit, in that general mobile solid state sometimes referred to as fluidized solids.

Figure 3:
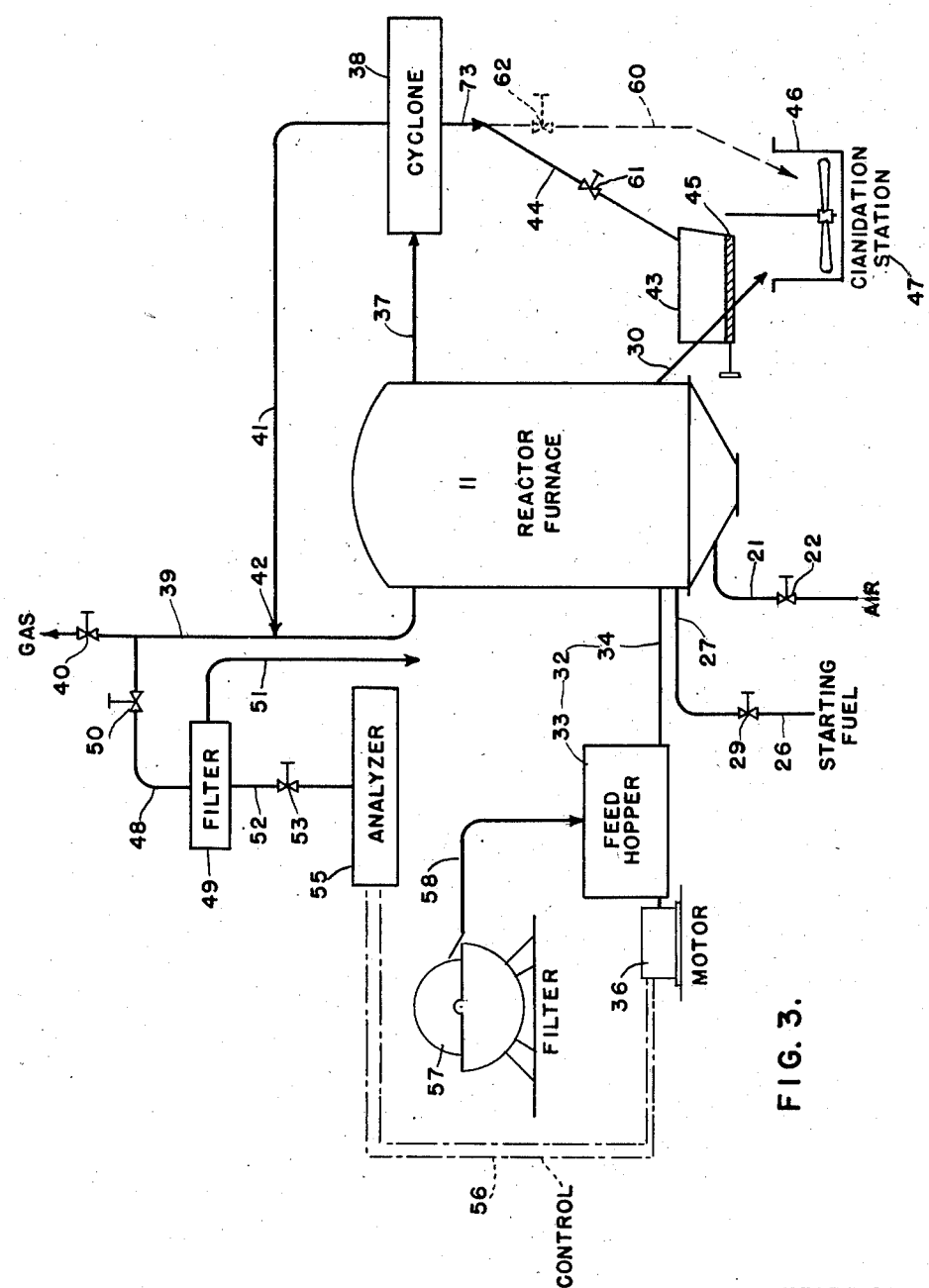
Figure 3 is a diagrammatic view illustrating a manner in which the reactor furnace may be employed in a system for performing the invention hereof.

It has been necessary to control the amount of oxygen available in the reactor particularly if arsenopyrite gold-bearing ores are to be successfully treated therein. Having this in mind, reference is made to a manner in which the reactor furnace 11 may be embodied in a system for treating such ore and to that end reference is made to Figure 3. In this figure it will be noted that the gas take-off pipe 37 which may be viewed as a main gas off-take leads to a cyclone or dust-separating means 38 for eliminating from the gas gold-bearing solid particles which collect in the cyclone while the gases freed of said solids pass from the cyclone or dust-separating means 38 along piping 41 to locality 42 whereat it merges and delivers into the pipe 39.

Treated solids or roasted products discharged from the treating compartment through pipe 30 are delivered into a cooling and storage means 43 and into said last-mentioned means solids collected within the cyclone 38 are or may be delivered by pipe or conduit means 44. From this cooling and storage means 43 the solids therein are fed as by suitable screw means 45 into a cyanidation tank or receptacle 46 in the cyanidation station 47.

In the operating of the reactor, it has been pointed out that the control of operating conditions therein depend to a substantial extent on the character of the gas leaving the reactor and more particularly upon the limitations on the oxygen content therein. For determination of the oxygen content of the outgoing gases—if oxygen is therein—and for utilization of such determination as a factor or guide in controlling the operation of the reactor furnace, there is provided for the withdrawal pipe 39 a branch 48 leading to a filter 49, for filtering-out solids entrained with the withdrawn gas, and an analyzer 54 that functions according to the quantity of free-oxygen in the gases which pass thereto from the filter.

The branch pipe 48 is controlled by a stop valve 50. From the filter 49 the solids are discharged along a path 51, while the gas freed from the solids passes from the filter along another path provided by passage means 52 having a valve 53 and into the oxygen analyzer 54. The oxygen analyzer is preferably automatic and of a continually operative type, and has associated therewith a motor-controlling means 55 with wirings 56 leading to the motor 36. The oxygen analyzer and associated motor-controlling means function according to the oxygen content in the gaseous medium passing to the analyzer, or according to lack of oxygen in the gas passed to the analyzer to control the speed of the rotor of the motor. Otherwise expressed, when the analyzer indicates or functions according to a condition in which an oxygen content in excess of $5/10$ of one per cent, exists in the gas, the analyzer in turn functions to cause the motor-controlling means 55 and the wiring thereof to increase the supply of electrical energy to the motor and thereby speed it up and thus increase the relative quantity of material fed from the hopper 33 into the reactor furnace 11 whereby according to the increase of feed material there is an increased requirement and utilization of the oxygen so that the oxygen content in the resulting gas will substantially lessen toward the disappearing point. Accordingly, as the oxygen content gradually lowers or is brought toward zero, the speed of the motor is again adjusted so as to realize a decreased rate of delivery of feed material for treatment such that there remains a trace of oxygen in the given off gas.

If it is not desired to operate the process with such elaborate equipment as that outlined above, then the process may be controlled by either observing the color of the stack plume or by observing the color of the finished roast and making the appropriate controls previously outlined.

We have determined and demonstrated that the practical and commercial mode of effecting and realizing a desired oxygen control condition is by operating the furnace in the manner herein described under conditions such that there is substantially no oxygen in the outgoing gases; also so that there is supplied to the material undergoing treatment sufficient quantities of oxygen whereby a thorough roasting of the ores sufficient for driving off or burning all of the oxidizable content of the ores or, as otherwise expressed, whereby the roasted ore will be free of any unoxidized residue of oxidizable mineral.

Assuming that the material to be treated has been fed into a reactor as 11, that the reactor has been brought to operating conditions by the supply of fuel as through the pipe 26, that there is a proper supply of air as from the pipe 21, and that the bed of material 23 is in proper fluidized condition and properly heated to a temperature in excess of 500° C. and also bearing in mind that when in this condition the fuel supplied for starting up as through pipe 26 has been shut off, the process can then be viewed as started up and self-sustaining, because the burning of sulfur and other elements in the ore is an exothermic reaction and supplies sufficient heat for continuing the process. From then on the process is substantially as follows:

Feed material supplied for treatment, to wit, arsenopyritic gold-bearing ore of such fineness as to at least pass through a 10 mesh screen (Tyler) is progressively delivered to the bed in finely divided form. The solids of the bed are maintained in a state of fluid solids suspension. Just enough air is supplied thereto for effecting a complete decomposition as hereinbefore defined. General operative conditions are maintained such that there is no substantial amount of free-oxygen for any substantially extended period in the gases leaving the reactor and also under such conditions that if and when the oxygen content of outgoing gas rises to any substantial extent above zero there is supplied an increased quantity of feed material into the bed of solids undergoing treatment whereby to decrease the intensity of the oxidation potential within the reactor.

From that which has preceded, it will be observed that as the process is practised the relatively constant supply of finely divided ore to be treated is delivered into one portion of the bed at a locality relatively remote from the region whereat treated solids overflowing from the bed pass into the inlet end or portion 31 of downflow pipe 30 through which the overflowed roasted solids products pass and from which they are delivered into the cooling and storage means 43. From the latter the cooled products are ultimately delivered according to operative requirements for cyanidation treatment into the tank 46 of the cyanidation station 47. Other fine solid particles of the process such as are obtained by the cyclone or dust-separating means 31 are also passed into the storage bin through the line 44 or alternately through the line 60 into the cyanidation tank. The cyclone or other dust recovery means is preferably operated at an elevated temperature, thereby preventing the condensation of arsenic trioxide gas which will otherwise contaminate the recovered dust. The line 44 is provided with a shut-off gate 61 and the alternative line 60 is provided with a shut-off gate 62 for determining through which pipe the fines from the cyclone 38 are to pass. The process is continuous and the quantity of air is relatively constant. The constant quantity of air supplied, however, may be varied by adjustment of the valve 22 in the air line 21 but for and during an established normal operation this valve 22—when once set—continues in its adjusted or set position. The rate of addition of ore for roasting is essentially constant during any period of uniformity of chemical composite of raw ore fed, but it is subject at all times to regulation according to the oxygen content of the stack gas of the roaster, as previously described. The line 44 is provided with a shut-off gate 61 and the alternative line 60 is provided with a shut-off gate 62 for determining through which pipe the fines from the cyclone 38 are to pass. The process is continuous and the quantity of air is relatively constant. The constant quantity of air supplied, however, may be varied by adjustment of the valve 22 in the air line 21 but for and during an established normal operation this valve 22—when once set—continues in its adjusted or set position. The rate of addition of ore for roasting is essentially constant during any period of uniformity of chemical composition of raw ore fed, but it is subject at all times to regulation according to the oxygen content of the stack gas of the roaster, as previously described. It is preferable in an apparatus of this type to use for the flow-constriction plate 18 one having the balls 25 in association with the apertures or constricted passageway 23 thereof. These balls function not merely as check valves but aid in distributingly delivering the air which is supplied under pressure into and throughout the lower region of the fluidized bed of solids.

By the invention hereof there is realized (1) the complete roasting of the ore in a single stage with essentially complete consumption of $O_2$ and with substantially no sulfide and especially arsenic sulfide or unoxidized sulfur in the roasted product from the mineral ore; (2) an opportunity for watching or testing exit gas from the process to determine whether any $O_2$ is present therein and relative quantity or percentage thereof in the gases; (3) there is realized the employement of a single stage operation of a character which one can control carefully, or as otherwise expressed, one can realize careful controllability to properly proportion the feed and air relative to each other and one is also able to attain an effective and efficient heating operation according to which no additional fuel for heating is required since heat losses are minimized.

It will appear from the foregoing wherein we have described the construction and manner of operation of a roasting apparatus for roasting arsenical gold ores, comprising a single-chamber reactor wherein substantial oxidation of oxidizable elements present in the raw ore is attained together with substantially complete utilization of the oxygen content of the air supplied to the roaster; that such a roaster may be also constructed so as to comprise a multi-compartment reactor, in which roasting occurs in two or more chambers in series. Such a roaster is to be considered as utilizing the invention hereof if the oxidization of arsenical substances or minerals present in the raw ore fed to such a roaster takes place under conditions such that the amount of oxygen supplied to that phase of roasting is not in excess of requirements for that phase of roasting, so that substantially no oxygen is present in the stack gas issuing therefrom. While the process as described herein is essentially continuous, nevertheless it is within the scope of this invention to include any process which by its nature is continual.

Having now particularly described and ascertained the nature of our said invention and in what manner the same is to be performed, we declare that what we claim is:

1. The continuous process for roasting finely-divided gold bearing arsenopyrite ore solids to condition them for cyanide leaching, comprising establishing and maintaining an ever-changing bed of such solids in an enclosed chamber by feeding such solids thereto and discharging them therefrom, maintaining solids of the bed at roasting temperatures, maintaining the bed as a turbulently mobilized fluidized bed by passing therethrough at fluidizing velocities an uprising stream of free-oxygen bearing gas, discharging gases from the bed and from the chamber, and controlling roasting conditions within the bed by regulating the quantity of free-oxygen supplied to the bed to be an amount sufficient to react substantially all of the arsenopyrite solids according to the equation $$FeAsS + 2\tfrac{5}{12}O_2 \rightarrow \tfrac{1}{3}Fe_3O_4 + \tfrac{1}{2}As_2O_3 + SO_2$$

but insufficient to react all of the arsenopyrite solids according to the equation $$FeAsS + 2\tfrac{9}{12}O_2 \rightarrow \tfrac{1}{2}Fe_2O_3 + \tfrac{1}{2}As_2O_3 + SO_2$$

so that volatile compounds of arsenic are formed and substantially removed from the bed entrained in the uprising gases discharged therefrom while the formation of both non-volatile arsenic compounds and ferric oxide is minimized; whereby previously entrapped gold values of the solids are rendered amenable to cyanide leaching.

2. The process according to claim 1, wherein the amount of free-oxygen supplied to the bed lies in the range of from substantially 100% of the stoichiometric amount as defined by the reaction $$FeAsS + 2\tfrac{5}{12}O_2 \rightarrow \tfrac{1}{3}Fe_3O_4 + \tfrac{1}{2}As_2O_3 + SO_2$$

to substantially 120% of such theoretical amount whereby oxygen is furnished to oxidize oxidizable impurities and the above-mentioned reaction is not impaired by free-oxygen deficiency.

JAMES B. McKAY.
JAMES V. THOMPSON.

REFERENCES CITED

The following references are of record in the file of this patent:

UNITED STATES PATENTS

| Number | Name | Date |
|---|---|---|
| 1,818,846 | Giles | Aug. 11, 1931 |
| 1,887,452 | Edwards | Nov. 8, 1932 |
| 2,030,627 | Freeman | Feb. 11, 1936 |
| 2,086,193 | Silsby | July 6, 1937 |
| 2,128,107 | Tyrer | Aug. 23, 1938 |
| 2,444,990 | Hemminger | July 13, 1948 |